United States Patent
Sassen

[11] Patent Number: 6,096,351
[45] Date of Patent: Aug. 1, 2000

[54] EDIBLE VEGETABLE FAT-COMPOSITION

[75] Inventor: Cornelis Laurentius Sassen, Vlaardingen, Netherlands

[73] Assignee: Lipton, Division of Conopco, Inc., Englewood, N.J.

[21] Appl. No.: 09/101,676

[22] PCT Filed: Jan. 24, 1997

[86] PCT No.: PCT/EP97/00392

§ 371 Date: Jul. 15, 1998

§ 102(e) Date: Jul. 15, 1998

[87] PCT Pub. No.: WO97/28695

PCT Pub. Date: Aug. 14, 1997

[30] Foreign Application Priority Data

Feb. 9, 1996 [EP] European Pat. Off. ............. 96200307

[51] Int. Cl.[7] ................................................ A23D 9/02
[52] U.S. Cl. ............................ 426/33; 426/607; 435/134
[58] Field of Search .............................. 426/601, 606, 426/607; 435/134

[56] References Cited

U.S. PATENT DOCUMENTS

| | | | |
|---|---|---|---|
| 3,617,308 | 11/1971 | Graffelman | 426/607 |
| 4,268,527 | 5/1981 | Matsuo | 426/607 |
| 4,275,081 | 6/1981 | Coleman | 426/601 |
| 4,447,462 | 5/1984 | Tafuri | 426/601 |
| 5,061,498 | 10/1991 | Matsuzaki | 426/601 |
| 5,288,619 | 2/1994 | Brown | 426/607 |
| 5,576,045 | 11/1996 | Cain | 426/607 |
| 5,658,768 | 8/1997 | Quinlan | 426/601 |
| 5,690,985 | 11/1997 | Van Meeteren | 426/607 |
| 5,718,938 | 2/1998 | Cain | 426/607 |
| 5,786,019 | 7/1998 | Cain | 426/607 |
| 5,795,969 | 8/1998 | Fehr | 426/601 |
| 5,869,124 | 2/1999 | Elliott | 426/601 |
| 5,908,654 | 6/1999 | Cain | 426/603 |
| 5,972,412 | 10/1999 | Sassen | 426/607 |

FOREIGN PATENT DOCUMENTS

| | | |
|---|---|---|
| 0109721 | 11/1983 | European Pat. Off. . |
| 0369519 | 5/1990 | European Pat. Off. . |
| WO95/07620 | 3/1995 | WIPO . |

OTHER PUBLICATIONS

Swern 1982 Bailey's Industrial.

*Primary Examiner*—Carolyn Paden

[57] ABSTRACT

An edible vegetable fat-composition is provided that does not contain hydrogenated fat, that contains 15–45% stearic acid, less than 15% palmitic acid and 45–85% of unsaturated C18 fatty acid residues such that the combined amount of acids with 16 or more carbon atoms is at least 95%, wherein the 2-position of the glycerides of the fat-composition comprises 5–45% saturated fatty acid residues and 95–55% unsaturated fatty acid residues. The composition can be prepared with the use of ester interchange. The fat-composition has elevated solid fat contents at 20–30° C. It can be used e.g. for preparing edible plastic fat products such as margarine and spreads.

17 Claims, No Drawings

EDIBLE VEGETABLE FAT-COMPOSITION

BACKGROUND OF THE INVENTION

The invention relates to an edible fat-composition which is suitable for e.g. spread manufacture. From a nutritional point of view vegetable fats are preferred over animal fats, but without further processing these vegetable fats are not solid enough for the manufacture of high quality spreads. Hydrogenation is a traditional method for increasing the melting point of vegetable oils. According to modern nutritional insights there is a need for edible vegetable fat-compositions with a suitable consistency but which have not been subjected to chemical processing, particularly not to hydrogenation.

The present invention deals with an edible vegetable fat-composition with an increased solid fat content and which has not been subjected to hydrogenation. The invention also relates to a process for preparing such fat-composition and to an edible plastic fat-product comprising at least a fat phase wherein the fat-phase comprises such an edible vegetable fat-composition.

From EP 369 519 fat-compositions are known which have a stearic acid residue content of 15–45%, a palmitic acid residue content of less than 15% and a content of unsaturated C18 acid residues of 45–85%, the combined amount of fatty acid residues having a chain length of 16 or more carbon atoms being at least 95%. The specification discloses that this kind of fat-composition, which is for example found in high stearic acid residue containing varieties of soybean oil, can be used as such, without modification, as a fat which constitutes the fat-phase of spreads. An advantage of such spreads is that it combines a fatty acid distribution which is considered nearly perfect from a health point of view with very little processing. Many customers appreciate such products because these are perceived to be more natural.

However, when investigating these fat-compositions the problem was considered of their solid fat content which at ambient temperature is still relatively low and which makes them less suitable for many potential applications.

SUMMARY OF THE INVENTION

We have now found fat-compositions of the above described type in which 5–45% saturated fatty acid residues and 95–55% unsaturated fatty acid residues are placed at the 2-position of the triglycerides of the fat-composition. The effect is that they show solid fat contents in the 20–30° C. temperature range ($N_{20}$–$N_{30}$), which are increased compared with the fats of EP 369 519. Plastic fat-products, e.g. spreads, made with such fat-composition show improved firmness over a substantial part of said temperature range. They can be produced easily using conventional methods.

Accordingly the present invention provides an edible vegetable fat-composition not containing hydrogenated fat having a stearic acid residue content of 15–45%, a palmitic acid residue content of less than 15%, and a content of unsaturated C18 fatty acids residues of 45–85%, the combined amount of fatty acid residues having a chain length of 16 or more carbon atoms being at least 95% the ratio of (HOH+HHO) to (HLH+HHL) triglycerides being less than 1.0, which is characterized in that on the 2-position of the triglycerides of the fat-composition 5–45% of the fatty acid residues are saturated and 95–55% are unsaturated. H means any C18, C20, C22 or C24 saturated fatty acid, O means an oleic acid residue and L means a linoleic acid residue.

DETAILED DESCRIPTION OF THE INVENTION

The invention further provides a process for preparing the fat-composition according to the invention, which comprises the steps:

A. subjecting a non-hydrogenated vegetable fat having a stearic acid residue content of at least 15%, a palmitic acid residue content of less than 15% and a content of unsaturated C18 acid residues of at least 30% to ester interchange involving all three positions of the glycerides to obtain an ester-interchanged fat, and, B. optionally blending 10–100% of the ester-interchanged fat with up to 90% of vegetable non-hydrogenated non-interesterified fat.

In the present specification ester interchange is also denoted as interesterification.

Hydrogenation is not a part of the process for preparing the present fat-compositions which are derived from edible fats originating from vegetable sources.

The overall fatty acid residues distribution of the found fat-composition comprises 15–40% stearic acid residues less than 15% palmitic acid residues 45–85% unsaturated C18 acid residues at least 95% fatty acid residues having a chain length of 16 or more carbon atoms, on the 2-position 5–45% of saturated fatty acid residues and 95–55% of unsaturated fatty acid residues, the ratio of (HOH+HHO) to (HLH+HHL) triglycerides being less than 1.0.

The invention also provides an edible plastic fat-product comprising at least a fat phase wherein the fat phase comprises a fat-composition according to the present invention. Preferred embodiments of the fat-composition and of the process are given in the claims.

The soybean oil variety disclosed in the above mentioned patent EP 369 519 with a high content of stearic acid residues has on the 2-position of the triglycerides only 2.4 wt. % of saturated fatty acid residues. We found that when this content is raised, also the solid fat content of the fat-composition at the temperature range of 20–30° C. is raised and the firmness of the products prepared with this fat-composition is increased.

According to a preferred embodiment of the present invention such-fat-composition can be obtained by subjecting part or all of the starting material having the appropriate overall fatty acid distribution to ester interchange involving all three positions of the triglycerides. Preferably the ester interchange is a random interesterification i.e. resulting in a random distribution of the fatty acids over all three triglyceride positions. Such ester interchange can be effected by a chemical or enzymatic interesterification process. The enzyme, preferably, has substantially equal activity for all three positions of the triglycerides. Suitable enzymes may be chosen from the group of enzymes derived from *Candida rugosa* (see Biochem. Biophys. Acta 231:15(1971)), *Corynebacterium acnes* (see Biochem. Biophys. Acta 242:381(1971), *Staphylococcus aureus* (see: Lipids, 9:158 (1974)), *Candida lipolytica* and *Pseudomonas fluorescens*.

In this way the hardness of the obtained fat-composition at ambient temperature is improved, but without change in the overall fatty acid distribution.

The higher the portion of the fat-composition that is subjected to ester interchange, the greater is the increase of fat solids in the temperature range of 20–30° C. The amount of saturated fatty acid residues on the 2-position may become so high, particularly when exceeding 35% and resulting in a high amount of solids melting above body temperature, that the organoleptic properties of the composition are adversely affected. Usually the fat that has been subjected to ester interchange is mixed with other vegetable non-hydrogenated fat, such that the resulting fat-composition has less than 35% saturated fatty acid residues on the 2-position of the glycerides.

Alternatively, for fats which already have a relatively high amount of saturated fatty acid residues, it suffices when only a relatively small portion of the composition is subjected to ester interchange in order to obtain the desired melting behaviour. Accordingly, in the present process 10–100%, preferably 15–90%, particularly 20–70% of the fat constituting the fat-composition has been subjected to ester interchange. The resulting amount of saturated fatty acid residues on the 2-position of the glycerides of the fat-composition should be 5–45%, preferably 5–40%, more preferably 7–35% and 10–30% being particularly preferred. The balance of the fatty acid residues on the 2-position consists of unsaturated fatty acid residues.

In U.S. Pat. No. 3,748,348 a directed interesterification is described, where the temperature is so low that not all fat is fully liquid. In most of the patent examples the solid fat index (SFI) at 33.3° C. is still about half of the SFI at 0° C. and sometimes even higher. The fat-compositions exhibit very flat SFI-lines and therefore have limited applicability. Because at such low temperatures the ester exchange process becomes very slow, usually taking many days, it is time consuming and therefore very expensive. The ester interchange in the present process is preferably carried out at a temperature at which the fat is substantially fully liquid.

According to a specific embodiment the ester interchange is effected using a 1,3-specific enzyme comprising the steps of A1 subjecting the fat to enzymatic ester interchange in the presence of sufficient water to allow partial glycerides to form and acyl migration to occur, and A2 re-esterification of the partial glycerides to obtain the ester-interchanged fat.

In step A1 the amount of water present during enzymatic interesterification with a 1,3-specific enzyme, particularly a lipase, is relatively high. As a consequence, partial glycerides, especially 1,2- and 2,3-diglycerides and 2-monoglycerides are formed. The remaining fatty acid residues are distributed over all three positions of the glycerol moiety. For example in the presence of sufficient water a UUS (S=saturated, U=unsaturated) triglyceride can be converted into a -US diglyceride with U on the 2-position and a saturated fatty acid at the terminal position. Acyl migration can convert this diglyceride, possibly via a 1,3-diglyceride intermediate (U-S) into a US- diglyceride with S on the 2-position.

Step A2 comprises re-esterification of the partial glycerides, preferably by reducing the water content of the reaction medium. Mono- and diglycerides are converted into diglycerides and, mainly, triglycerides. Suitable amounts of water to be present in the steps A1 and A2 can readily be determined by monitoring the increase, and subsequent decrease of partial glycerides in the reaction medium, e.g. by means of carbon number analysis. Suitable 1,3-specific enzymes may be chosen from the group derived from *Rhizopus delemar, Mucor miehei, Aspergillus niger* and *Muror javanicus* lipases.

The fat that is to be subjected to ester interchange preferably has an overall fatty acid residue distribution which already meets the prescribed properties of the present fat-composition and more preferably actually has the preferred properties of the present fat-composition. Then the best results are obtained.

The resulting fat-composition of the invention consists predominantly of triglycerides. Small amounts of other glycerides, e.g. diglycerides, may also be present as well as non-glyceride materials e.g. tocopherols. Preferably, the triglycerides constitute at least 90%, preferably at least 95% of the fat-composition.

The use of fat fractionation in the present invention is not necessary. In order to minimize processing hydrogenation is definitely not and fractionation is preferably not employed. Reactions involving stearic acid or short chain derivatives thereof are not acceptable and not necessary for obtaining the present fat-composition. The use of free stearic acid or esters of stearic acid and short chain alcohols is avoided, because the stearic acid moiety invariably is produced using chemical processes involving not only hydrogenation, but also hydrolysis. Production of stearic acids derivatives (short chain esters or ethers) involves even further chemical processes.

The fat-composition preferably comprises at least 75%, more preferably 80–100%, particularly 85–95% of fatty acid residues with 18 carbon atoms in the chain. Since the composition is a vegetable one and has not been hydrogenated these C18 fatty acids residues consist essentially of stearic acid, oleic acid (cis-monounsaturated), linoleic acid (all-cis polyunsaturated) and linolenic acid (all-cis polyunsaturated). From a nutritional point of view, these are the most preferred fatty acids. For the best nutritional balance, the composition should comprise 45–85%, preferably 50–85%, more preferably 55–80% and particularly 60–75% unsaturated C18 fatty acid residues. Preferably at least 15% of these, more preferably 15–80%, particularly 20–50% of these unsaturated C18 fatty acid residues consist of polyunsaturated fatty acid residues. The fat-composition preferably has a ratio of (HOH+HHO) to (HLE+HHL) triglycerides being less than 0.85.

Apart from C18 fatty acid residues the composition may comprise saturated C16 palmitic acid residues. Such acids are less desirable from a nutritional point of view, but in practice their presence in small amounts can not easily be avoided. A small amount of palmitic acid may even contribute to a better processability of the fat-composition and to the properties of the resulting product. Accordingly the fat-composition preferably comprises 0–12%, more preferably 0–10%, particularly 1–8% of palmitic acid residues.

The stearic acid residue content preferably is 15–35%, more preferably 18–30%. Preferably stearic acid residues constitute at least 50%, preferably 75–100% of the saturated fatty acid residues of the fat-composition. Apart from these acids, small amounts of other fatty acids e.g. palmitoleic acid and C20 or C22 fatty acids may be present. The amount of fatty acid residues other than palmitic acid and C18 acids is preferably less than 15%, more preferably 0–10%, particularly 0–5%. Specifically, fatty acid residues with 14 or less carbon atoms in the chain are preferably substantially absent, e.g. less than 1%.

Particularly suitable starting oils are high stearic acid residue containing varieties of soybean oil, linseed oil, rapeseed oil, sunflower oil, maize oil, cottonseed oil, rice bran oil and mixtures of such oils. Traditional versions of such oils are essentially liquid at around 10° C. and even down to 5° C., but nowadays varieties of such oils with a high content of stearic acid residues have become available. Some of the latter oils contain about 20% of stearic acid and 65–70% of unsaturated C18 acids. They may contain as little as only 1.5% or even 1.0% of saturated acids on the 2-position of the triglycerides.

The present invention is particularly advantageous for increasing the usability of said new oil varieties. Such oil, already containing as much as 30% of stearic acid residues, can be made still harder by-placing the saturated acid reasidues at the 2-position of the triglycerides. For some applications this oil may become hard enough to allow incorporation of an amount of the traditional liquid version of the oil, e.g. regular low erucic acid rapeseed oil, into the fat-composition.

Whereas regular palm oil is preferably not used in the composition, a high stearic acid containing version of palm oil could be employed. Preferably the fat constituting the fat-composition is derived from a high stearic acid residue containing variety of a vegetable oil and mixtures of two or more of such high stearic oil varieties.

According to another preferred embodiment the fat constituting the fat-composition is derived from a single type of plant, for example solely from soybean or solely from sunflower or solely from rapeseed. Such "single oil" versions of the fat-composition may include, but preferably do not include the traditional liquid oil of that plant type.

The solids content of a fat at a given temperature is denoted by its $N_t$-value, where N is the percentage of solids as determined by NMR measurement (see General) and t is the temperature.

The $N_{20}$ of the present fat-composition preferably is 4–35, more preferably 5–30, and 10–25 being particularly preferred. $N_{35}$ preferably is less than 5, especially 0–3.

The fat-compositions of the invention are particularly suitable for making fat-products such as spreads and shortenings. Fat-products such as spreads and shortenings are plastic and preferably comprise a continuous fat phase. Such fat phase may include apart from fat other materials e.g. emulsifiers, colourants, flavour and the like. The fat of the fat phase comprises the present fat-composition, preferably in an amount of at least 50%, more preferably 75–100%. Most preferably the fat of the fatphase consists of the present fat-composition, i.e. essentially does not include fat other than the present fat-composition.

If the product contains an aqueous phase, it is preferably a dispersed aqueous phase. It may comprise, apart from water, other usual ingredients, depending on the application, e.g. dairy ingredients derived from milk, preservatives, hydrocolloids for structuring or thickening the aqueous phase, e.g. gelatine or starch. The fat phase of the fat-product preferably constitutes 10–100%, more preferably 30–85%, particularly 65–85% of the fat-product, the balance, if any, consisting preferably of dispersed aqueous phase.

Throughout this specification, all parts and percentages are by weight, unless otherwise indicated. For fatty acid residues, the amounts are expressed with respect to the total weight of the fatty acid residues. Plastic fat-products can be produced by standard methods as described in e.g. Hoffmann, The Chemistry and Technology of Edible Oils and Fats and their high Fat Products, Academic Press London, (1989).

The invention is illustrated by the following examples:

GENERAL

The content of a certain type of triglyceride in a fat can be evaluated with conventional methods, e.g. using GLC for the fatty acid analysis in combination with carbon number analysis together with general knowledge about the fats employed in case these are relatively simple in triglyceride structure, and/or in combination with 2-position analysis using partial hydrolysis of the 1,3-positions of the triglycerides and the 1,3 random distribution assumption.

Suitable methods are for example described in EP 78568 (FAME and Carbon number analysis), JAOCS, 68(5), (1991), 289–293 (Silverphase HPLC), F. D. Gunstone et al., The Lipid Handbook, 2nd edition, (1994), Chapman & Hall, London, pages 338–340 (Silver nitrate TLC) and A.O.C.S. Official Method Ch. 3–91, 1–4, (2-position analysis) N-values can conveniently be measured as described in Fette, Seifen, Anstrichmittel, 80,(1978), 180–186 by means of NMR. A suitable procedure is: heat the fat to 60° C. for melting it completely, keep it at 0° C. for 16 hours and then keep it for 30 minutes at the measuring temperature t, e.g. 20° C. A solid fat content measured at t°C. is indicated by $N_t$.

Carbon number analysis is carried out as described in EP 78568. The fatty acid residues distribution of a fat can also be determined as described in EP 78568. Analysis of the fatty acid residues on the 2-position of glycerides is done as described by Coleman in JAOCS 38, (1961), 685–8.

EXAMPLE 1

A high stearic soybean oil with the following fatty acid distribution was employed:

| | |
|---|---|
| Palmitic | 8.2% |
| Stearic | 21.6% |
| Oleic | 19.2% |
| Linoleic | 41.9% |
| Linolenic | 5.0% |
| Other | 4.1% |

1.5% of the fatty acids on the 2-position of the triglycerides consist of saturated fatty acid residues and 98.5% of unsaturated fatty acid residues.

The oil was subjected to random interesterification using sodium methylate as interesterification catalyst under conventional conditions. The overall fatty acid distribution of the resulting fat-composition was the same as that of the starting material, but 32.9% of the fatty acids on the 2-position of the triglycerides are now saturated fatty acids and 67.1% are unsaturated fatty acids. The resulting (HOH+HHO) to (HLH+HHL) triglycerides ratio is 0.46.

The solid fat content as a function of the temperature ($N_T$) of the resulting fat-composition and of the starting material are mentioned in Table I.

TABLE I

| Temperature ° C. | $N_T$ fat-composition | $N_T$ starting material |
|---|---|---|
| 10 | 22.5% | 16.4% |
| 20 | 7.2% | 1.0% |
| 30 | 3.6% | 0.1% |
| 35 | 2.1% | 0% |

Fat phases for a fat-product were prepared both with the fat-composition and (for comparison) with the starting material by admixing both with 0.1% of monoglycerides and 0.2% of soybean lecithin. From these fat phases shortenings were prepared by passing them through a laboratory Votator line with an AAC sequence. The products were filled in tubs and stored at 5° C. for 3 days. After 3 days, the comparison product made from the starting material did not have a good texture. The product prepared with the fat-composition according to the invention had a much better texture. The products were left to stand at 23° C. for 5 hours. Within this time, the comparison product melted, while the product of the invention did not.

EXAMPLES 2 AND 3

Starting oils are the high stearic soybean oil of example 1 and a high stearic rapeseed oil. The latter oil has the following fatty acid distribution:

| | |
|---|---|
| Palmitic | 3.4% |
| Stearic | 29.7% |
| Oleic | 30.9% |
| Linoleic | 22.0% |
| Linolenic | 4.0% |
| Arachidic | 6.1% |
| Behenic | 1.8% |
| Other | 2.1% |

The triglycerides on the 2-positions of the rapeseed oil comprised 1.1% saturated fatty acid residues and 98.9% unsaturated fatty acid residues.

The HS rapeseed oil was subjected to random interesterification as described in example 1. The high stearic bean oil and the high stearic rapeseed oil were blended. For comparison also a blend was made using the non-interesterified HS rapeseed oil. For blending ratios see Table II.

TABLE II

| Composition of | Soybean oil | Rapeseed oil | Interest. Rapes. oil |
|---|---|---|---|
| example 2 | 70% | | 30% |
| example 3 | 75% | | 25% |
| comp. blend | 75% | 25% | |

Table III shows the characteristics of the three fat blends.

The fat-compositions of examples 2 and 3 described above are suited for the preparation of a tub margarine or a spread with reduced fat content. Such products can withstand several hours storage at 25° C. As a contrast a product prepared with the comparison fat blend will quickly melt away at 25° C.

TABLE III

| | example 2 | example 3 | comp. blend |
|---|---|---|---|
| N10 | 23.6% | 21.5% | 21.1% |
| N20 | 6.7% | 5.1% | 3.8% |
| N25 | 3.3% | 2.6% | 0% |
| N30 | 2.7% | 2.0% | 0% |
| N35 | 1.0% | 1.4% | 0% |
| Overall fatty acid distribution | | | |
| palmitic | 6.8% | 7.0% | 7.0% |
| stearic | 24% | 23.6% | 23.6% |
| oleic | 22.7% | 22.1% | 22.1% |
| linoleic | 35.9% | 36.9% | 36.9% |
| linolenic | 4.7% | 4.8% | 4.8% |
| arachidic | 3.1% | 3.0% | 3.0% |
| behenic | 1.5% | 1.5% | 1.5% |
| other | 1.3% | 1.1% | 1.1% |

TABLE III-continued

| | example 2 | example 3 | comp. blend |
|---|---|---|---|
| 2-position fatty acid distribution | | | |
| saturated | 13.8% | 11.7% | 1.4% |
| unsaturated | 86.2% | 88.3% | 98.6% |
| (HOH + HHO) to (HLH + HHL) ratio | 0.71 | 0.66 | 0.77 |

EXAMPLE 4

Starting materials are high stearic rapeseed oil and high stearic soybean oil having the following fatty acids distribution:

| | high stearic rapeseed oil | high stearic soybean oil |
|---|---|---|
| Palmitic | 3.6% | 7.6% |
| Stearic | 31.3% | 27.5% |
| Oleic | 30.2% | 23.2% |
| Linoleic | 24.0% | 33.5% |
| Linolenic | 3.9% | 3.5% |
| Arachidic | 5.2% | 2.5% |
| Behenic | 1.3% | 1.0% |
| Other | 0.5% | 1.2% |

A fat-composition was prepared by blending 50% of the high stearic soybean oil with 50% of the high stearic rapeseed oil, which before has been subjected to chemical interesterification as described in example 1. A comparison fat blend was prepared in the same way but none of the incorporated fractions was subjected to interesterification.

While the overall fatty acid distribution of both blends remained unchanged, their fatty acid distribution on the 2-position differed significantly. The first blend contained 22.3% and the-comparison blend only 2.0% of saturated fatty acid residues on the 2-position, the balance-to 100% were unsaturated fatty acid residues. The ratio of the triglycerides (HOH+HHO) and (HLH+HHL) triglycerides in the fat blend incorporating the interesterified oil equaled 0.91.

Table IV shows the solid fat levels ($N_T$) for both fat phases.

From the figures of Table IV it appears that the blend containing the interesterified high stearic rapeseed oil is well suited for the manufacture of products as wrapper margarines or spreads. This does not hold for the comparison fat blend. This fat blend would yield very hard products at low temperatures while the products would not have sufficient stability at higher temperatures. Therefore this blend is not suited for margarine or spread manufacture.

TABLE IV

| Temperature °C. | $N_T$ fat phase with interesterified fraction | $N_T$ fat phase without interesterified fraction |
|---|---|---|
| 5 | 44.8% | 54.8% |
| 10 | 39.4% | 46.1% |
| 15 | 29.5% | 35.2% |
| 20 | 17.6% | 21.0% |
| 25 | 9.3% | 5.1% |
| 30 | 4.9% | 0.5% |
| 35 | 3.4% | 0% |

EXAMPLE 5

A fat blend was made containing 30 parts of the interesterified high stearic rapeseed oil as described in example 4, 20 parts of rapeseed oil and 50 parts of high stearic soybean oil.

The latter oils have the following fatty acids distribution:

|  | rapeseed oil | high stearic soybean oil |
|---|---|---|
| Palmitic | 4.3% | 7.6% |
| Stearic | 1.7% | 27.5% |
| Oleic | 62.8% | 23.2% |
| Linoleic | 20.1% | 33.5% |
| Linolenic | 9.2% | 3.5% |
| Arachidic | 0.6% | 2.5% |
| Behenic | 0.3% | 1.0% |
| Other | 1.0% | 1.2% |

The blend contained 5.7% of palmitic acid, 23.5% of stearic acid and 70.5% of unsaturated C18 fatty acids. A comparison blend was made with the same ratios but non-interesterified high stearic rapeseed oil was used. The first blend contained 9.8% and the comparison blend only 1.7% of saturated fatty acid residues on the 2-position, the balance to 100% were unsaturated fatty acid residues.

The ratio (HOH+HHO) to (HLH+HHL) of the first blend equaled 0.79. Table V shows the solid fat levels ($N_T$).

TABLE V

| Temperature °C. | $N_T$ fat-composition with interesterified fraction | $N_T$ fat-composition without interesterif. fraction |
|---|---|---|
| 5 | 32.1% | 27.3% |
| 10 | 27.2% | 21.9% |
| 15 | 17.8% | 13.4% |
| 20 | 9.1% | 4.9% |
| 25 | 4.7% | 0% |
| 30 | 2.7% | 0% |
| 35 | 1.8% | 0% |

From the data in Table V it is apparent that the comparison fat blend is poorly suited for margarine or spread manufacture, because it would quickly melt away at ambient temperatures. The fat phase containing 30% of interesterified high stearic rapeseed oil was used to produce a 70% fat spread with the following composition:

| 69.7 parts | fat phase with interesterified high stearic rapeseed oil |
| 0.075 part | monoglycerides |
| 0.075 part | lecithin |
| 0.15 part | β-carotene colorant |
| 28.9 parts | water |
| 0.7 part | whey powder |
| 0.3 part | salt |
| 0.1 part | preservatives |
| p.m. | lactic acid to p.H. 4.8 |

Prior to processing a premix of all components was kept at 50° C. and then processed on a conventional laboratory votator line (sequence A-A-C). A fat continuous spread with a dispersed water phase was obtained which was filled into tubs. The further process conditions were:

| 4.5 kg/h | throughput |
| 9.0° C. | temperature at tap |
| A1 and A2 | 600 rpm |
| C | 100 rpm |

The process was repeated with the comparison fat phase. For both spreads the Stevens values were determined using a Stevens texture analyser. The probe head had a diameter of 4.4 mm.

After one week of storage at 5° C. the resulting Stevens-values at a given temperature ($S_T$) were $S_5$=408 and $S_{20}$=67 and after 3 weeks $S_5$=419 and $S_{20}$=68.

The lower temperature Stevens-values of the comparison product were found to be lower although in a similar range, but at the higher temperature significantly lower Stevens values were measured for the comparison product, which lacked sufficient stability at ambient temperatures.

When exposing both products to 25° C. for one day the differences became more visible. The product of the invention kept its structure ($S_{25}$=51) and regained texture after being stored again at lower temperatures ($S_{10}$=275). In contrast to this the comparison product completely melted away during a day of storage at 25° C. The mouthfeel and spreadability of the product according to the invention fully satisfied the requirements.

EXAMPLE 6

A fat blend was prepared by mixing 40 parts of high stearic rapeseed oil with 60 parts of high stearic soybean oil, which oils have the following fatty acid profile:

|  | high stearic soybean oil | high stearic rapeseed oil |
|---|---|---|
| Palmitic | 8.2% | 3.4% |
| Stearic | 21.6% | 27.3% |
| Oleic | 19.2% | 36.4% |
| Linoleic | 41.9% | 23.2% |
| Linolenic | 5.0% | 3.4% |
| Arachidic | 1.8% | 4.5% |
| Behenic | 1.1% | 1.1% |
| Other | 1.2% | 0.7% |

The high stearic soybean oil had been-subjected to chemically catalysed interesterification as described in example 1.

A comparison blend was prepared in the same way but with high stearic soybean oil which was not interesterified. The first blend contained 20.4% and the comparison blend only 1.4% of saturated fatty acid residues on the 2-position, the balance to 100% were unsaturated fatty acid residues.

The ratio of the triglycerides (HOH+HHO) and (ELH+HHL) triglycerides in the fat blend incorporating the interesterified oil equaled 0.71.

Table VI shows the solid fat content ($N_T$) for the two fat blends.

TABLE VI

| Temperature °C. | $N_T$ composition with interesterif. fat | $N_T$ comparison composition without interesterif. fat |
|---|---|---|
| 5 | 31.5% | 30.1% |
| 10 | 26.5% | 20.9% |
| 15 | 17.5% | 11.1% |
| 20 | 7.9% | 3.2% |
| 25 | 3.2% | 0% |
| 30 | 1.8% | 0% |
| 35 | 0.9% | 0% |

The figures show that the comparison fat-composition is not suited for the manufacture of a margarine or a spread with sufficient consistency. A margarine was prepared in the same way as described in example 5, using the following components:

| | |
|---|---|
| 79.75 parts | fat-composition with interesterified high stearic soybean oil |
| 0.05 part | monoglycerides |
| 0.05 part | lecithin |
| 0.15 part | β-carotene colorant |
| 18.9 parts | water |
| 0.7 part | whey powder |
| 0.3 part | salt |
| 0.1 part | preservatives |
| p.m. | lactic acid to p.H. 4.8 |

The components were combined to a premix which was kept at 50° C. prior to processing. For the processing a conventional laboratory Votator line (sequence A-A-C) was used, so that a fat continuous margarine with a dispersed water phase was obtained which was filled into tubs. The further process conditions were:

| | |
|---|---|
| 4.5 kg/h | throughput |
| 8.8° C. | temperature at tap |
| A1 and A2 | 600 rpm |
| C | 100 rpm |

The process was repeated with the comparison fat phase. For both products the Stevens values were determined using a Stevens texture analyser. The probe head had a diameter of 4.4 mm.

After one week of storage at 5° C. the resulting Stevens-values at a given temperature ($S_T$) were $S_5$=356 and $S_{20}$=33 and after 3 weeks $S_5$=360 and $S_{20}$=33.

The lower temperature Stevens-values of the comparison product were found to be lower, but at the higher temperature significantly lower Stevens values were measured for the comparison product, which lacked sufficient stability at ambient temperatures.

When exposing both products to 25° C. for one day the differences became more visible. The product of the invention kept its structure ($S_{25}$=33) and regained texture after being stored again at lower temperatures ($S_{10}$=170). In contrast to this the comparison product completely melted away during a day of storage at 25° C. The mouthfeel and spreadability of the product according to the invention fully satisfied the requirements.

What is claimed is:

1. Edible vegetable fat-composition not containing hydrogenated fat having
    a stearic acid residue content of 15–45%,
    a palmitic acid residue content of less than 15%,
    a content of unsaturated C18 fatty acid residues of 45–85%,
    the combined amount of fatty acid residues having a chain length of 16 or more carbon atoms being at least 95%,
    the ratio of (HOH+HHO) to (HLH+HHL) triglycerides being less than 1.0,
which is characterized in that on the 2-position of the triglycerides of the fat-composition 5–45% of the fatty acid residues are saturated and 95–55% are unsaturated.

2. Fat-composition according to claim 1 which does not comprise fractionated fat.

3. Fat-composition according to claim 1, wherein at least a portion of the fat constituting the fat-composition has been subjected to ester interchange involving all three positions of the triglycerides.

4. Fat-composition according to claim 3, wherein 10–100%, of the fat constituting the fat-composition has been subjected to ester interchange.

5. Fat-composition according to claim 1, wherein the fat constituting the fat-composition is derived from a high stearic acid residue containing variety of soybean oil, linseed oil, rapeseed oil, sunflower oil, safflower oil, palm oil, maize oil, cottonseed oil, rice bran oil or a mixture of two or more of these oils.

6. Fat-composition according to claim 1, wherein the fat constituting the fat-composition is derived from a single type of plant.

7. Fat-composition according to claim 1, wherein the 2-position of the glycerides of the fat-composition comprises 5–40% of saturated fatty acid residues.

8. Fat-composition according to claim 1 having a palmitic acid residue content of 0–12%.

9. Fat-composition according to claim 1 having a stearic acid content of 15–35%.

10. Fat-composition according to claim 1 having a content of unsaturated $C_{18}$ acid residues of 50–85%.

11. Fat-composition according to claim 1, wherein at least 15% of the unsaturated $C_{18}$ acid residues are polyunsaturated acid residues.

12. Fat-composition according to claim 1, having a ratio of (HOH+HHO) to (HLH+HHL) triglycerides being less than 0.85.

13. Process for preparing an edible vegetable fat-composition that does not comprise hydrogenated fat comprising
    A. subjecting a non-hydrogenated vegetable fat having a stearic acid residue content of at least 15%, a palmitic acid residue content of less than 15% and a content of unsaturated C18 acid residues of at least 30% to ester interchange involving all three positions of the glycerides to obtain an ester-interchanged fat, and
    B. blending 10–100% of the ester-interchanged fat with up to 90% of vegetable non-hydrogenated fat such that the resulting fat-composition
        has a stearic acid residue content of 15–45%,
        has a palmitic acid residue content of less than 15%,
        has a content of unsaturated C18 acid residues of 45–85%, comprises at least 95% fatty acid residues having a chain length of 16 or more carbon atoms,
        the ratio of (HOH+HHO) to (HLH+HHL) triglycerides being less than 1.0,
        comprises on the 2-position of the glycerides 5–45% saturated fatty acid residues and 95–55% of unsaturated fatty acid residues.

14. Process according to claim 13 wherein the ester interchange is carried out at a temperature at which the fat is substantially fully liquid.

15. Process according to claim 13 or claim 14 wherein the ester interchange is a random interesterification.

16. Process according to claim 13 wherein the ester interchange is effected using a 1,3-specific enzyme and by comprising the steps of
    A1. subjecting the fat to enzymic ester interchange in the presence of sufficient water to allow partial glycerides to form and acyl migration to occur, and
    A2. causing re-esterification of the partial glycerides to occur, to obtain the ester-interchanged fat.

17. Edible plastic fat product comprising at least a fat phase wherein the fat phase comprises a fat-composition according to claim 1.

* * * * *